(12) United States Patent
Jajtic et al.

(10) Patent No.: US 7,969,144 B2
(45) Date of Patent: Jun. 28, 2011

(54) SENSOR DEVICE FOR MEASURING A MAGNETIC FIELD

(75) Inventors: Zeljko Jajtic, München (DE); Gerhard Matscheko, Starnberg (DE); Stefan Schiele, Stetten (DE)

(73) Assignee: Siemens Aktiengesellschaft, München (DE)

( * ) Notice: Subject to any disclaimer, the term of this patent is extended or adjusted under 35 U.S.C. 154(b) by 803 days.

(21) Appl. No.: 11/575,815

(22) PCT Filed: Sep. 16, 2005

(86) PCT No.: PCT/EP2005/054601
§ 371 (c)(1),
(2), (4) Date: Feb. 5, 2008

(87) PCT Pub. No.: WO2006/040235
PCT Pub. Date: Apr. 20, 2006

(65) Prior Publication Data
US 2008/0246466 A1  Oct. 9, 2008

(30) Foreign Application Priority Data

Sep. 22, 2004 (DE) .......................... 10 2004 045 934

(51) Int. Cl.
*G01B 7/14* (2006.01)
*G01B 7/30* (2006.01)

(52) U.S. Cl. ............ 324/207.2; 324/207.25; 324/207.24

(58) Field of Classification Search .................. None
See application file for complete search history.

(56) References Cited

U.S. PATENT DOCUMENTS

| 4,734,603 | A | | 3/1988 | von der Heide et al. | |
|---|---|---|---|---|---|
| 5,093,617 | A | * | 3/1992 | Murata | 324/235 |
| 6,016,055 | A | * | 1/2000 | Jager et al. | 324/165 |
| 6,344,742 | B1 | * | 2/2002 | Kobayashi et al. | 324/248 |
| 6,590,385 | B2 | * | 7/2003 | Valles | 324/174 |
| 2003/0042892 | A1 | | 3/2003 | Nagai et al. | |

FOREIGN PATENT DOCUMENTS

| DE | 101 61 905 A1 | 6/2003 |
|---|---|---|
| DE | 102 23 362 A1 | 12/2003 |
| ER | 1 244 198 A1 | 9/2002 |
| FR | 2 631 178 | 11/1989 |
| JP | 50146802 A | 11/1975 |
| JP | 07123524 | 5/1995 |
| JP | 08168232 | 6/1996 |
| JP | 2002153039 | 5/2002 |

* cited by examiner

*Primary Examiner* — Jay M Patidar
(74) *Attorney, Agent, or Firm* — Henry M. Feiereisen; Ursula B. Day

(57) ABSTRACT

A sensor device for measuring a magnetic field in the region of a primary part of a permanently excited electrical machine or a corresponding primary part having teeth includes a sensor metal plate for conducting a magnetic field, a spacer, and a sensor for measuring a magnetic field. A distance between the sensor metal plate and a flank of a tooth of the primary part can be created by the spacer. The sensor may be a Hall sensor and is arranged in a region of the sensor metal plate between the sensor metal plate and the primary part.

16 Claims, 2 Drawing Sheets

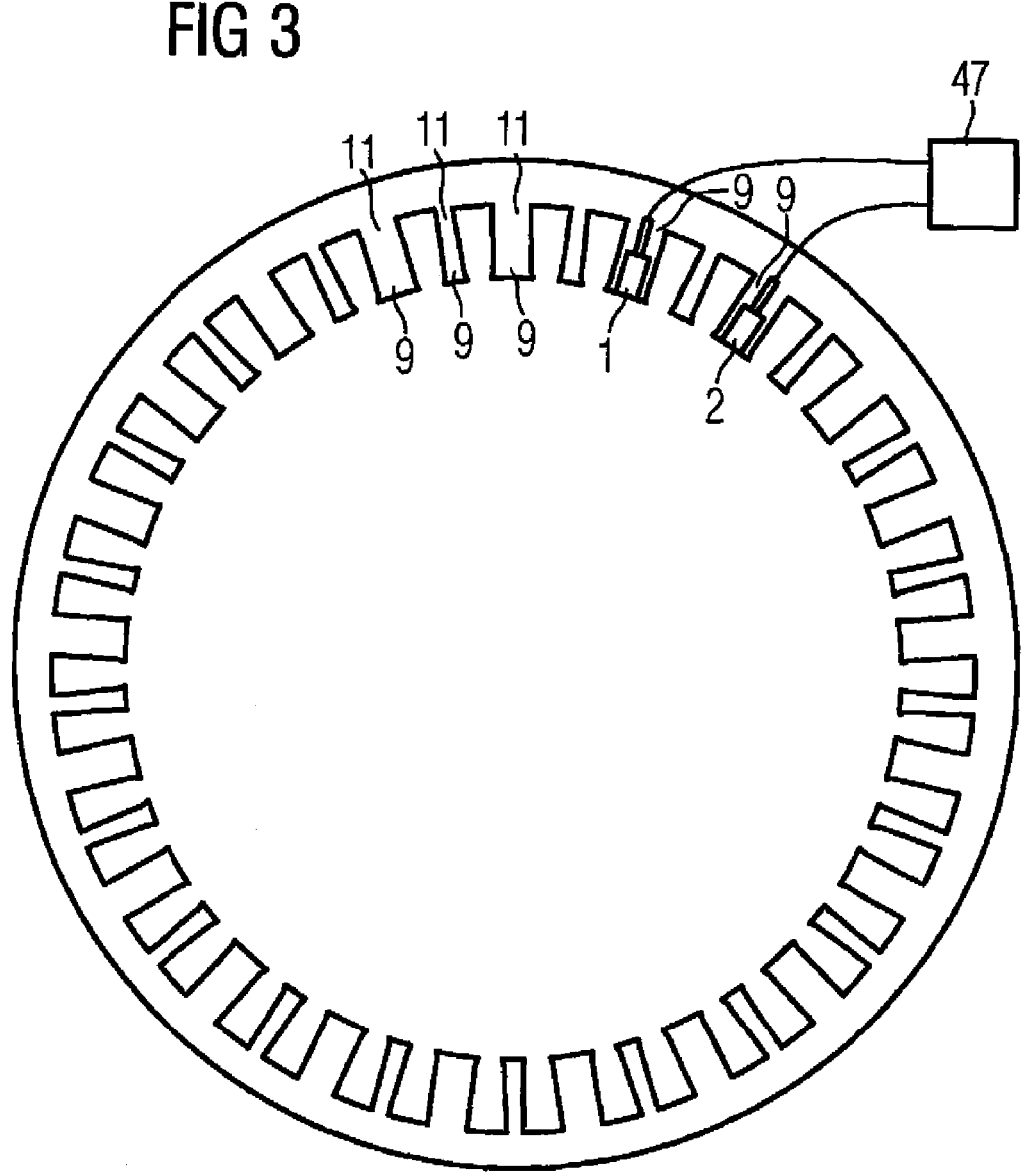

SENSOR DEVICE FOR MEASURING A MAGNETIC FIELD

CROSS-REFERENCES TO RELATED APPLICATIONS

This application is the U.S. National Stage of International Application No. PCT/EP2005/054601, filed Sep. 16, 2005, which designated the United States and has been published as International Publication No. WO 2006/040235 and which claims the priority of German Patent Application, Serial No. 10 2004 045 934.7, filed Sep. 22, 2004, pursuant to 35 U.S.C. 119(a)-(d).

The invention relates to a sensor device and to a primary part with a sensor device, it being possible to use the sensor device for measuring a magnetic field or a magnetic flux.

BACKGROUND OF THE INVENTION

In an electrical machine, for example a linear motor or a torque motor, where the electrical machine has a primary part or a secondary part, it is necessary to use an encoder or a corresponding sensor in order to determine the position of the primary part with respect to the secondary part. The electrical machine is, for example, a permanently excited synchronous machine, with the result that the secondary part of the electrical machine has permanent magnets. The primary part is, for example, the stator of a rotary electrical machine and the secondary part is, for example, the armature of the electrical machine. In a linear motor, the primary part is, for example, the moving part and the secondary part, which has permanent magnets, is the stationary part.

For operation of, for example, permanently excited synchronous machines on a converter, it is necessary to know the absolute position of the secondary part. In rotary machines, the absolute position is the rotor position, with the rotor being the armature and the rotor position thus being the armature position. An absolute encoder is generally required in order to determine the rotor position. This absolute encoder is a technically complex means for determining the rotor position. A relative encoder is then sufficient and also customarily used for operation of a permanently excited synchronous machine. To date, the absolute rotor position has been detected by means of separate sensors. The sensors are arranged outside a main magnetic circuit of the electrical machine, with the result that it is not possible for such a sensor to also detect the main magnetic circuit. By way of example, a Hall sensor in a separate box outside a housing of a primary part of the linear motor is required in a linear motor. The separate box serves to evaluate the stray flux of permanent magnets of a secondary part of the linear motor. In rotary machines, for example a torque motor, it is not possible, for design reasons, to use a separate box of this type which has a Hall sensor. In a torque motor, it is only possible to detect the rotor position by means of a dedicated sensor track of a sensor which is fitted to the torque motor.

SUMMARY OF THE INVENTION

The object of the present invention is to specify an improved sensor device for measuring a magnetic field in the region of a primary part of a permanently excited electrical machine.

According to one aspect of the present invention, the object is achieved by a sensor device for measuring a magnetic field in the region of a primary part of a permanently excited electrical machine, with the primary part having teeth, wherein the sensor device has a means for conducting a magnetic flux, which means is, in particular, a sensor laminate, a spacer and a sensor for measuring a magnetic field, it being possible to create a distance between the means for conducting a magnetic flux and a flank of a tooth of the primary part by means of the spacer, with the sensor being arranged in a region of the means for conducting a magnetic flux between this means and the primary part, with the sensor being, in particular, a Hall sensor.

According to another aspect of the present invention, the object is achieved by a primary part of a permanently excited electrical machine, which primary part has teeth and a back, with the teeth having a flank, wherein a sensor device for measuring a magnetic field is arranged at least partially in the region of the flank of a tooth.

Integration of the sensor in the magnetic circuit of a primary part produces great advantages in terms of application. It is advantageous that no additional space is required for the sensor. The reason for this is, in particular, the compactness of the sensor device. In torque motors, there is, for example, little space for the installation of sensors. Since the sensor device according to the invention can be built so as to be very compact, this sensor device can also be used in torque motors. A further advantage of the sensor device according to the invention is that it is now possible to avoid and even prevent faulty positioning of the sensor or the sensor device since the sensor or the sensor device is integrated in the magnetic circuit.

In an inventive sensor device for measuring a magnetic field in the region of a primary part of a permanently excited electrical machine, the sensor device has a means for conducting a magnetic flux. The primary part of the permanently excited electrical machine has teeth. Furthermore, the primary part is designed in such a way that it has windings. The windings can be wound around the teeth. The sensor device has a means for conducting a magnetic flux, with this means being a flux conduction piece. The means is therefore provided for the purpose of conducting a magnetic flux or magnetic fields. One example of such a means is a metal plate, referred to in the following description as laminate. Since this laminate is used for a sensor, said laminate is also called sensor laminate. The sensor device also has a spacer and a sensor. The sensor is provided for measuring a magnetic field or a magnetic flux. The spacer creates a distance between the means for conducting the magnetic field and a tooth of the primary part. A tooth of the primary part has a flank. The flank is the side of a tooth which represents a side end of the tooth when the electrical machine is viewed from the side. If the primary part is, for example, laminated, the flank is the side of a laminate which is not adjoined by a further laminate, with further laminates adjoining another side of the laminate.

In the sensor device, a sensor is arranged in a region of the means for conducting a magnetic flux between this means and the primary part, with the sensor being, in particular, a Hall sensor. Rotor-position detection which is integrated in an electrical machine can be realized by means of the sensor device. The rotor-position detection is position detection of a secondary part, with the secondary part being, for example, an armature (which means the same as the term rotor) or, for example, a movement section of a primary part, with the movement section being formed by means of secondary parts which have permanent magnets.

The sensor device according to the invention therefore means that an additional device and an additional complicated method for detecting the rotor position and the position of a primary part of a linear motor are no longer necessary. Integrated rotor-position detection and detection of the position of a primary part of a linear motor, which is also called rotor-position detection in the text which follows, replaces, in particular, a Hall sensor box, particularly in the case of linear motors. As a result, no additional installation space is required within an installation area of a linear motor, for example for a carriage of a machine tool. Readjustment of the mounting position between the Hall sensor box and the primary part is also dispensed with as a result. A Hall sensor box cannot be used in torque motors since torque motors do not have any free-standing permanent magnets. Rotor-position detection by means of a sensor device according to the invention thus expands the functionality of a torque motor since it is now possible to reliably start-up the motor under load.

Since a magnetic field always prevails in a permanently excited synchronous machine (rotary or linear) due to permanent magnets, the sensor can always determine a magnetic field, it being possible to determine the positioning of the stator or of the armature of the electrical machine by a corresponding device, which is connected to the sensor, measuring the magnetic field. A device of this type can be realized, for example, in the open-loop and/or closed-loop control system of the electrical machine or in an associated power converter.

Improved rotor-position detection is also provided in cases in which movement-based rotor-position detection and a corresponding method cannot be realized since, for example, an initialization movement is not possible and/or permissible in the electrical machine on account of a restricted ability to move. The use of the sensor device in a torque motor, with the sensor device being used particularly for rotor-position detection, is a simple and cost-effective technical solution for expanding the functionality of the torque motor. A torque motor with a sensor device described in this invention has new functionalities in terms of detecting the position of a rotor or a primary part.

The sensor device, which has a sensor, also has a signal output. The signal is evaluated in a signal-evaluation device for example. The signal-evaluation device can, for example, be integrated in a programmable logic control or CNC (computerized numerical control) system or in an open-loop or closed-loop control system of a power converter. When the signal from the sensor is evaluated during operation of the electrical machine, signal influences which are caused by windings of the primary part being supplied with current are advantageously compensated for. In this way, it is possible to determine the commutation position during operation of the electrical machine. This can, for example, improve sensorless drives by detecting an additional variable, namely the magnetic flux. It is also possible to construct and also monitor diagnostic systems and/or motor models for simulating the behavior of the electrical machine.

The sensor device can be designed in such a way that it extends at least from a start of the tooth of the primary part to an end of the tooth of the primary part, with the end of the tooth of the primary part being opposite the permanent magnets of the secondary part, and the start of the tooth of the primary part being attached to a back of the primary part. If the end of the sensor device on which the sensor is arranged is in the region of the start of the tooth or in the region of the back of the primary part, it is thus possible for the magnetic fields to emerge from the means for conducting a magnetic field largely perpendicularly and to enter the primary part largely perpendicularly through the sensor. In this case, entry is gained in the region of the back of the primary part. As a result, very accurate measurement of the magnetic flux or the magnetic field is possible. As a result of the fact that the sensor device begins at the end of the tooth, it is also possible to very accurately measure the flux or the magnetic field through the tooth to which the sensor device is fitted. Consequently, measurement is predominantly determined by this magnetic flux and the negative influence of stray fluxes is largely avoided.

The initial commutation position and initialization of a relative encoder are achieved by an inventive rotor-position detection means which is integrated in the primary part. Additional devices and methods for detecting an initial commutation position of the rotor are dispensed with. An overall advantage arises when other methods are not possible, as is the case in rotary torque motors for example.

If the rotor position is identified, this being necessary for commutation, an incremental encoder can be initialized. Therefore, detection of the commutation position for a defined start-up of the electrical machine can be achieved as a function.

The electrical machine can be formed in such a way that the magnetic fields can be determined locally at a plurality of, but at least two, points of the primary part. These points are at a distance from one another in the movement direction of the motor part, it being possible for the distances between the individual points, with points also being understood as regions, to differ from the distances between the permanent magnets in a further advantageous embodiment. In this way, different phases, in particular phase positions, of the measurement signal from the sensor device which can be used to determine the position are produced at the individual measurement points. A sine signal and a cosine signal are usually generated and measured. The distance thus produces a phase shift through 90 degrees. In order to increase accuracy and redundancy of position determination, a plurality of sensor devices can be provided in an apparatus according to the invention, with the sensor devices each preferably being associated with a winding and/or a tooth of a primary part. Reliability can also be increased by means of a plurality of sensor devices.

In a further advantageous refinement of the sensor device, the means for conducting a magnetic flux is tapered in the direction of the sensor. The tapering serves to concentrate the magnetic flux and optimize sensor sensitivity. The sensor device therefore has a greater cross-sectional area in the region of the end of a tooth than in the region of the position of the sensor.

In a further advantageous refinement, the sensor can be cooled by a cooling device of the primary part. The accuracy of the sensor can be improved by means of this cooling device since the signal to noise ratio can be improved. Furthermore, more favorable sensors can be used, for example due to such a cooling measure.

The sensor device can, for example, be designed in such a way that the sensor laminate or the means for conducting a magnetic flux has the shape of a tooth of the primary part at least in one region. If the means for conducting the magnetic flux has the shape of a tooth, particularly in the region of the end of the tooth, with the shape relating particularly to the width of the tooth, it is therefore possible to ensure that the position-dependent course of the magnetic flux through the sensor device has the same shape as the useful flux of the primary part (ideally: sinusoidal). This increases the accuracy of the sensor device. One advantage of the sensor device according to the invention is its low space requirement. A further advantage is that incorrect mounting of the sensor device or of the sensor, for example by a customer, can be precluded by, in particular complete, integration in the primary part. The integration is the result, for example, of the fact that the sensor device is already connected to the primary part during production of said primary part. The sensor device can also be encapsulated with the primary part of the linear motor. In a further advantageous refinement, the sensor device is a fixed constituent part of the primary part, with the sensor of the sensor device being exchangeable, for example in the event of a defect.

The sensor device can also be used as a position sensor. The position sensor serves, for example, to determine the commutation angle during operation of the permanently excited electrical machine. In a further refinement, the position sensor serves to detect the initial commutation angle of the permanently excited electrical machine. This initial commutation angle is required for operation of the electrical machine.

An inventive primary part which is intended to be used in a permanently excited electrical machine, in particular a synchronous machine, has teeth and a back. The teeth are attached to the back of the primary part. The teeth also have a flank. If a tooth is formed by lining up laminates for example, the first and the last laminate of the tooth form the flank.

According to the invention, at least part of a sensor device is arranged in the region of the flank of a tooth in the primary part. The sensor device serves to measure a magnetic field or a magnetic flux. The primary part is accordingly formed in such a way that the sensor device does not directly evaluate free air induction of permanent magnets of a secondary part point by point but uses a part of the resulting motor flux for signal acquisition. The sensor device forms an axial or lateral overhang with respect to the magnetic circuit (laminated core) of the electrical machine. Since windings of the primary part run between the teeth and these windings have end windings, the sensor device can be positioned between a laminated core and end windings. It is therefore possible to arrange the sensor device or the sensor close to the laminated core of the electrical machine, with no additional installation space being taken up.

In a further advantageous refinement, the sensor device has a means for conducting a magnetic flux, which means is, in particular, a sensor laminate. The sensor laminate is positioned at a distance from the laminated core. An air gap region is formed between the means for conducting the magnetic flux and the laminated core. The air gap region can also be produced, for example, by a spacer which has a value for $\mu_r$ of approximately 1. Therefore, if the means for directing the magnetic flux is kept at a distance from the flank of the tooth of the primary part by means of a spacer, the direction of the magnetic flux can be prespecified in a simple manner. A sensor for measuring a magnetic field is arranged between the means for conducting the magnetic flux and the flank of the tooth. The sensor is, for example, a Hall sensor. This sensor is advantageously in an end region of the sensor device, with a further end region of the sensor device being in the region of the end of the tooth.

The sensor laminate, which serves as a flux conduction piece, at least partly has the tooth contour of a laminate section of the electrical machine in the region of the air gap, that is to say the distance from the flank of the tooth. The means for conducting the magnetic flux therefore serves as a kind of integrator for the magnetic flux of the permanent magnets. As a result, the sensor is provided with the same time and/or physical profile as the main motor flux. Shaping of the means for conducting the electrical flux in the region of the sensor can be matched to different design requirements of the electrical machine.

A further embodiment of the primary part, which has the sensor device, allows compensation of the interfering fields by the operating currents in the motor windings and therefore allows the commutation position to be identified during operation of the motor too. For compensation purposes, a second sensor element is deliberately oriented toward the end winding of the relevant coil such that interfering fields can be detected and a compensation signal can therefore be acquired. Compensation can be performed either directly in the sensor, that is to say by summing two analog Hall sensors for example, or using software by suitable signal evaluation operations and subsequent calculation of the rotor commutation position.

In a further advantageous refinement, the sensor is arranged in a start region of the tooth and/or in a region of the back of the primary part. As a result, it is possible for the magnetic field to run without any interference as far as possible, without stray fluxes having too great an influence.

In a further embodiment of the primary part, the means for conducting the magnetic flux—that is to say, for example, the sensor laminate—is oriented along the tooth, with the means for conducting the magnetic flux having a first end in an end region of the tooth, with the sensor, in particular the Hall sensor, being positioned in the region of a second end of the means for conducting the magnetic flux.

In one advantageous refinement, the primary part has two sensor devices for measuring the magnetic field, with the sensor devices serving particularly to acquire a sine signal and a cosine signal.

In a further refinement, the primary part is formed in such a way that the sensor device and/or part of the sensor device is/are arranged on the primary part such that it/they can be replaced.

BRIEF DESCRIPTION OF THE DRAWING

Exemplary embodiments of the invention are explained with reference to the attached drawings, in which:

FIG. 3 shows a cross section through a rotary electrical machine.

DETAILED DESCRIPTION OF PREFERRED EMBODIMENTS

Figure 1:
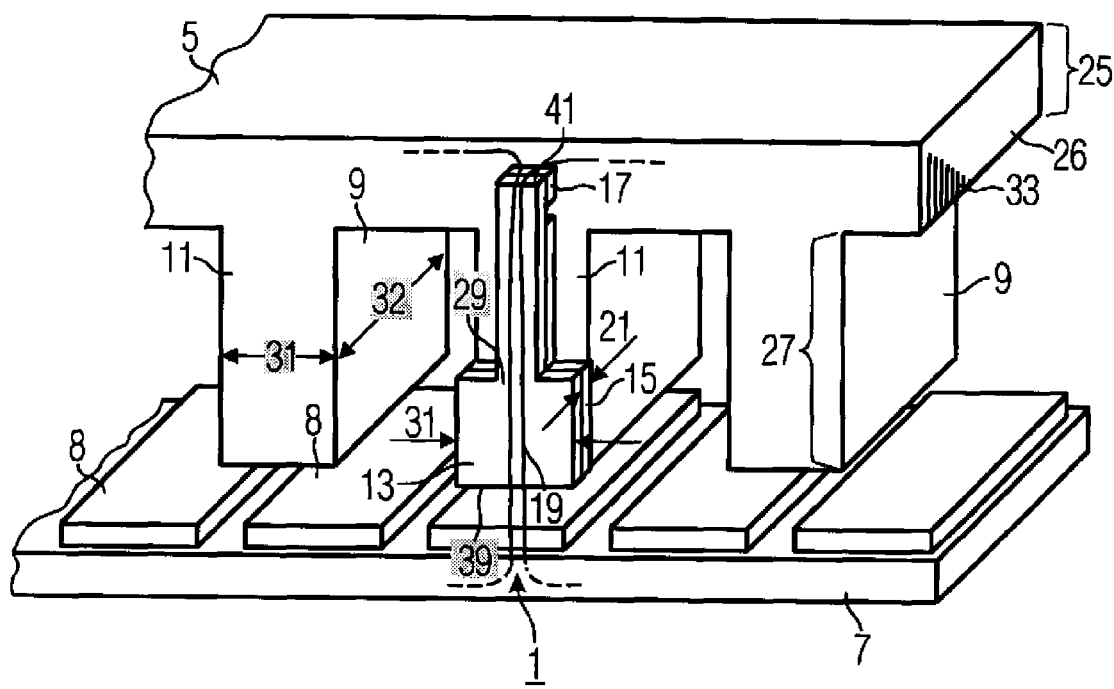
FIG. 1 shows a perspective view of a secondary part and a primary part of an electrical machine.

The illustration of FIG. 1 shows an electrical machine 3. The electrical machine 3 is a linear motor. The electrical machine 3 has a primary part 5 and a secondary part 7. The secondary part 7 has permanent magnets 8. The primary part 5 is laminated, with a plurality of laminates being positioned one behind the other in order to form the laminate arrangement 33. The primary part 5 also has a back 26 and teeth 9. The teeth 9 have a tooth width 31 and a tooth length 32. A flank 11 is formed in the region in which a laminate adjoins the laminate arrangement of the primary part 5. A sensor device 1 is positioned on the flank 11. The sensor device 1 is therefore positioned on the side of a primary part 5. The sensor device 1 is designed in a layered manner. The sensor device 1 has a sensor laminate 13. The sensor laminate 13 is at a distance from the flank 11. A distance 21 is created by means of a spacer 15. The sensor laminate 13 has a first end 39 and a second end 41. The first end 39 is positioned closer to the secondary part than the second end 41. A Hall sensor 17 is located in the region of the second end 41. The spacer 15 is removed in this region of the Hall sensor 17. The spacer 15 advantageously has a relative permeability of approximately $\mu_r \approx 1$. However, a refinement of the type in which the spacer serves to form an air gap is also possible, with this refinement not being illustrated according to FIG. 1.

The illustration of FIG. 1 also shows magnetic field lines 19 by way of example. The magnetic field lines 19 extend from the permanent magnets 8 to the sensor 17, where the magnetic field lines enter or emerge from a back region 25 of the primary part, preferably as far as possible perpendicularly. In an advantageous refinement of the sensor device 1, the sensor device 1 extends largely over a tooth region 27. Furthermore, the sensor device 1 is designed in such a way that it has two different widths. In the region close to the permanent magnets 8, the sensor device and in particular the sensor laminate largely have the width 31 of the tooth. Downstream of a tapered portion 29, the width of the sensor laminate 13 is reduced. This concentrates the flux.

Figure 2:
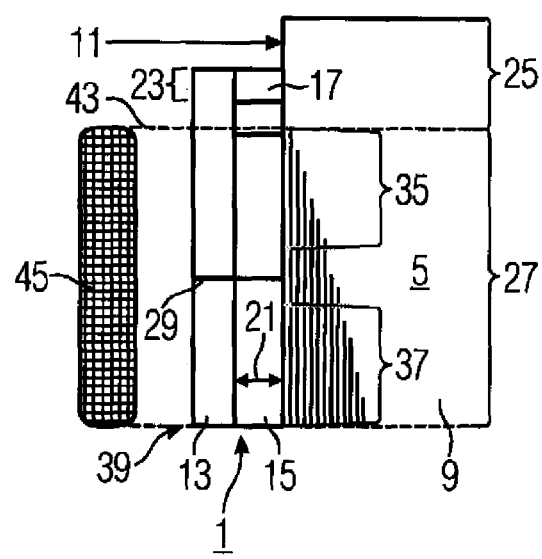
FIG. 2 shows a cross section through the primary part of the electrical machine.

The illustration of FIG. 2 shows a sectional outline illustration of a linear motor according to FIG. 1, with the secondary part not being illustrated. The primary part 5 has a back region 25 and the tooth region 27. The sensor 17 is positioned in the back region 25. The sensor is therefore arranged in a region 23 of the sensor laminate 13 which, in an electrical machine, is situated on that side of the sensor device which is remote from the permanent magnets of the secondary part. Windings which are indicated by dashed lines in FIG. 2 are located between the teeth of the primary part 5, with the winding 43 forming an end winding 45. The sensor device 1 is positioned between the end winding 45 and the side flank of the primary part 5. In this case, the sensor device 1 extends over an end region 37 of the tooth and a start region 35 of the tooth 9.

The illustration of FIG. 3 shows a laminate section of a rotary electrical machine, with two sensor devices 1 and 2 being positioned on different teeth 9 on the flank 11 which may be called an end face. FIG. 3 therefore shows the possible use of the sensor device according to the invention in a rotary electrical machine. The signals from the sensor devices 1 and 2 are evaluated in a signal-evaluation device 47.

What is claimed is:

1. A sensor device for measuring a magnetic field in the region of a primary part of a permanent-magnet electrical machine, with the primary part having teeth, said sensor device comprising:
   a conducting means for conducting a magnetic flux;
   a spacer for maintaining a distance between the conducting means and a flank of a tooth of the primary part; and
   a sensor, arranged in a region of the conducting means and extending between the conducting means and the flank of the tooth of the primary part, for measuring a magnetic field,
   wherein the conducting means is oriented along the tooth and has a first end in an end region of the tooth, with the sensor being positioned in a region of a second end of the conducting means.

2. The sensor device of claim 1, wherein the conducting means includes a metal plate.

3. The sensor device of claim 1, wherein the sensor is a Hall sensor.

4. The sensor device of claim 1, wherein the conducting means is tapered in a direction of the sensor.

5. The sensor device of claim 1, for use as a position sensor.

6. A primary part of a permanent-magnet electrical machine, comprising:
   a plurality of teeth, with the teeth having a flank; and
   a sensor device, arranged at least partially in a region of the flank of a tooth, for measuring a magnetic field, wherein the sensor device has a conducting means for conducting a magnetic flux, a spacer for maintaining a distance between the conducting means and the flank of the tooth, and a sensor, extending between the conducting means and the flank of the tooth, for measuring a magnetic field,
   wherein the sensor is arranged in at least one of a start region of the tooth and in a region of a back of the primary part.

7. The primary part of claim 6, wherein the conducting means includes a metal plate.

8. The primary part of claim 6, wherein at least part of the sensor device is detachably mounted to the primary part.

9. The primary part of claim 6, wherein the sensor is detachably mounted to the primary part.

10. The primary part of claim 6, wherein the sensor device includes a Hall sensor.

11. The primary part of claim 6, wherein the conducting means is tapered in a direction of the sensor device.

12. The primary part of claim 6, wherein the sensor device is constructed for use as a position sensor.

13. The primary part of claim 6, wherein the sensor device is constructed for use as a position sensor for determining a commutation angle during operation of the permanently excited electrical machine.

14. The primary part of claim 6, wherein the sensor device is constructed for determination of an initial commutation angle of the permanently excited electrical machine.

15. A primary part of a permanent-magnet electrical machine, comprising:
   a plurality of teeth, with the teeth having a flank; and
   a sensor device, arranged at least partially in a region of the flank of a tooth, for measuring a magnetic field, wherein the sensor device has a conducting means for conducting a magnetic flux, a spacer for maintaining a distance between the conducting means and the flank of the tooth, and a sensor, extending between the conducting means and the flank of the tooth, for measuring a magnetic field,
   wherein the conducting means is oriented along the tooth and has a first end in an end region of the tooth, with the sensor being positioned in a region of a second end of the conducting means.

16. A primary part of a permanent-magnet electrical machine, comprising:
   a plurality of teeth, with the teeth having a flank; and
   at least two sensor devices positioned on respective flanks of different teeth for measuring a magnetic field, wherein each said sensor device has a conducting means for conducting a magnetic flux, a spacer for maintaining a distance between the conducting means and the flank of the tooth, and a sensor, extending between the conducting means and the flank of the tooth.

* * * * *